May 7, 1935.    I. HECHENBLEIKNER    2,000,443
APPARATUS FOR THE TREATMENT OF A GAS BY A LIQUID
Filed Feb. 3, 1931    2 Sheets-Sheet 2
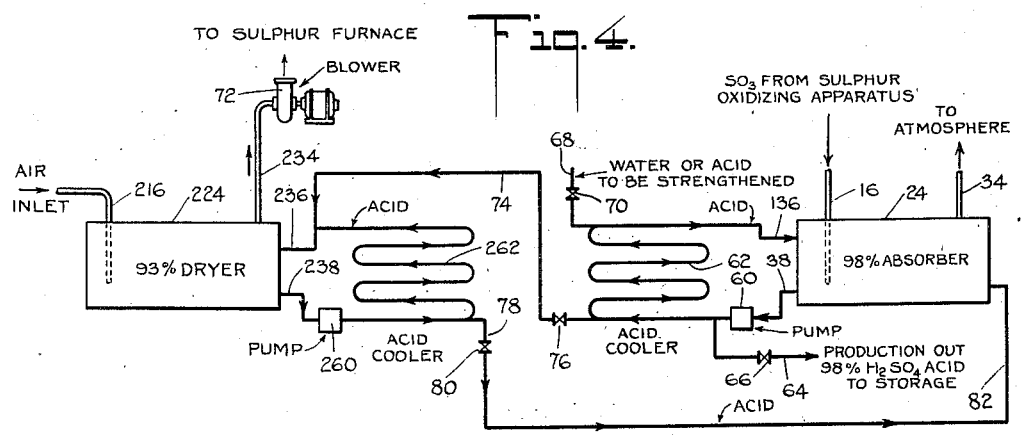
INVENTOR
Ingenuin Hechenbleikner
BY
ATTORNEYS Patented May 7, 1935

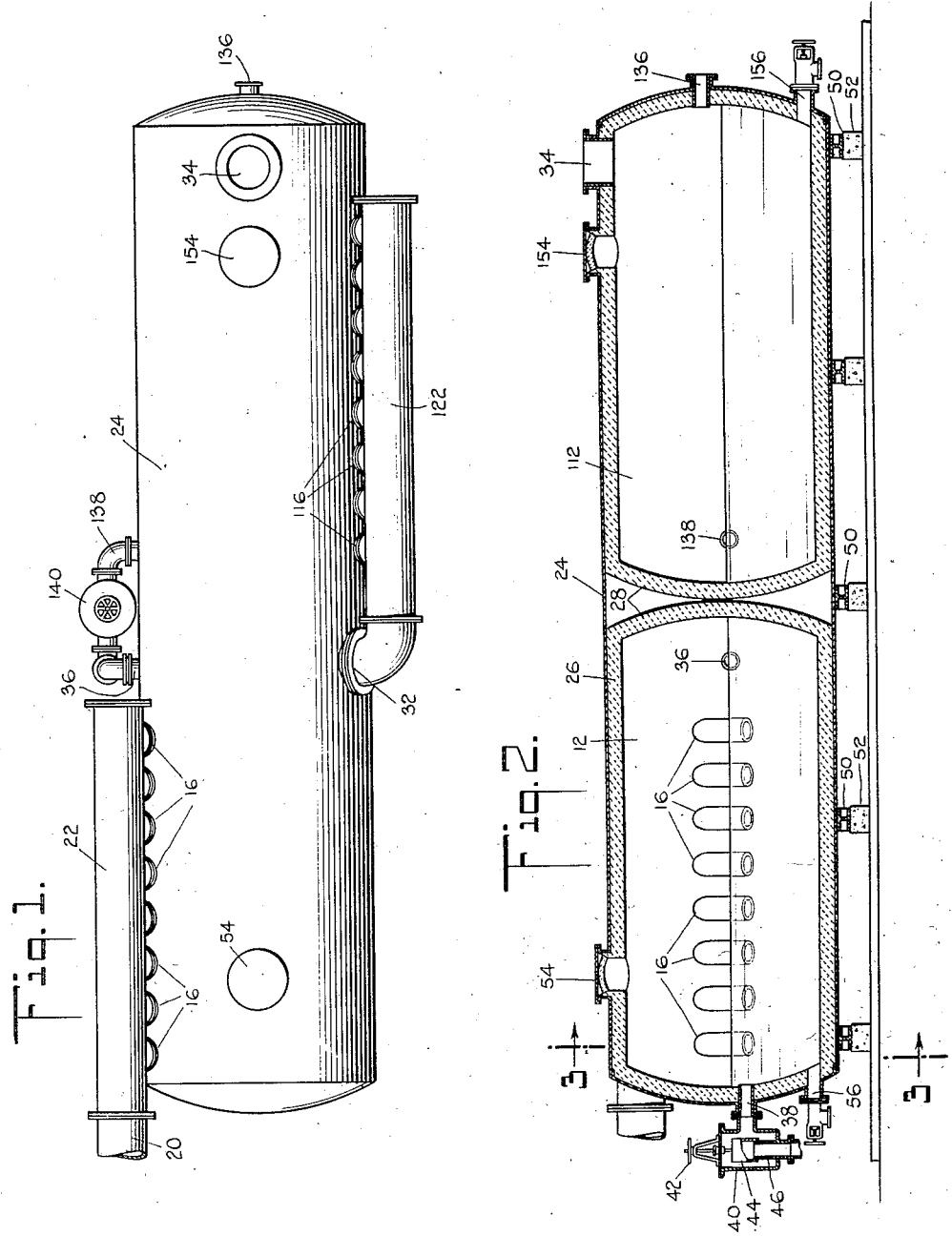

2,000,443

UNITED STATES PATENT OFFICE 2,000,443

APPARATUS FOR THE TREATMENT OF A GAS BY A LIQUID

Ingenuin Hechenbleikner, Charlotte, N. C., assignor to Chemical Construction Corporation, Charlotte, N. C., a corporation of Delaware Application February 3, 1931, Serial No. 513,091

6 Claims. (Cl. 261—121)

This invention relates to apparatus for bringing a gas and a liquid into intimate contact and mixture, and more particularly to apparatus for the absorption or washing of a gas by means of a liquid.

One of the primary objects of the present invention is to reduce the cost of operating such apparatus by minimizing the power needed both for the circulation of the liquid and for the circulation of the gas.

A further object of the present invention resides in the provision of apparatus for absorbing or washing a gas by means of a liquid, which is satisfactorily operable even with dirty liquid, and which normally keeps the dirt in circulation so as to prevent clogging of the apparatus, but which, when cleaning is necessary, may be readily and rapidly cleaned, thereby making it possible to dispense with the provision of spare units.

Further objects of the present invention are to obtain efficient and complete absorption or cleaning of the gas by means of the liquid, and to bring the gas and liquid into intimate contact by passing the gas through the liquid and also causing the liquid to fall through the gas.

To accomplish the foregoing objects, the present invention comprises a drum-shaped vessel arranged with its axis horizontal and provided with an inlet and an outlet for the liquid arranged to retain a body of the liquid in the drum. A gas inlet of special form is provided, which includes one, or, more preferably, a bank of downwardly directed nozzles arranged in parallel collateral juxtaposition along the length of the drum, the lower ends of said nozzles preferably being fully open and submerged in the liquid along one side of the drum so that the admitted gas is directed in a peripheral or tangential direction around the interior of the drum. The nozzles are also preferably arranged at a slant so as to obtain a maximum of whirling motion or violent agitation of the liquid by the gas. I have found that with such a construction the gas is passed through the body of liquid and so greatly agitates the same that the liquid descends in the form of a spray through the gas above the liquid, so that contact of the gas with the liquid, and then of the liquid with the gas, is obtained. At the same time, the liquid is kept in motion, so that the dirt is carried along with the liquid and cannot appreciably settle out at the bottom of the drum. The head or difference in height between the liquid inlet and outlet is negligible, thereby reducing the power needed for circulating the liquid, to a minimum. The nozzles for the gas discharge are large in diameter and are widely open at the immersed ends thereof, and this fact, together with the relatively small submergence of the nozzles, minimizes the power needed to pump the gas through the apparatus.

Another object of the invention is to provide downwardly directed nozzles having means for varying the submergence thereof during the operation of the apparatus, including adjustable overflow means to vary the depth of liquid in the drum.

While the present invention is widely applicable to various chemical processes some of which will be mentioned subsequently, it is here illustrated in connection with a sulphuric acid plant operated in conjunction with an oil refinery. Such refineries require the addition of fresh sulphuric acid to their concentrated restored sludge acid to replenish acid losses in their cycle of operation. The direct addition of sulphur trioxide, by absorption in the concentrated sludge acid, instead of the addition of strong sulphuric acid, is of great advantage, because the former step does not add water and therefore may be employed with less prior concentration of the sludge acid. The present apparatus is particularly valuable in this connection because the sludge acid is necessarily dirty and ordinarily is an exceedingly troublesome absorption medium.

A further object of the present invention is to insure complete absorption of sulphur trioxide in sulphuric acid, and to this end the absorption medium is held at about 98% strength sulphuric acid, thus providing exceedingly efficient absorption, and two drums are connected and operated in series, the second drum insuring that the final gas discharge is free from sulphur trioxide. To further improve the absorption efficiency, it is desirable to cool the circulating acid, and for this purpose cooling coils of conventional type may be added and the acid pumped therethrough during its circulation through the drums. To simplify the drum structure, a single steel shell may be provided, which is subdivided into two drums by a partitioned acid resistant lining therein, and these drums may be connected in series with one another and with a single cooling and pumping system.

Further objects of the present invention are to adapt the apparatus so far described to a variety of uses, such as the production of fuming sulphuric acid; the drying of air by means of sulphuric acid preparatory to supplying the same to the sulphur furnace in which sulphur is burned as part of the process for obtaining the acid anhydride; and apparatus for the absorption of different acid anhydrides such as sulphur dioxide, hydrogen chloride, oxides of nitrogen, and oxides of phosphorous.

To the accomplishment of the foregoing and such other objects as will hereinafter appear, my invention consists in the apparatus elements and their relation one to the other as hereinafter are more particularly described in the specification and sought to be defined in the claims. The specification is accompanied by drawings in which:

Fig. 1 is a plan view of a drum absorber or washer constructed in accordance with the present invention;

Fig. 2 is a section taken in elevation through the drum shown in Fig. 1;

Fig. 3 is a transverse section taken in elevation in the plane of the line 3—3 in Fig. 2; and Fig. 4 is a flow diagram illustrative of some of the uses of the present invention.

Referring to the drawings, and particularly Fig. 3 thereof, the absorber of the present invention comprises a preferably drum-shaped tank or vessel 12 which is partially filled with a body of liquid 14. The gas is admitted through a downwardly directed nozzle 16 which is located at one side of the drum and immersed in the liquid 14. As a result of the location of the nozzle, the gas is forced downwardly through the liquid, and flows peripherally around the interior of the drum. To aid this effect the nozzle 16 is preferably arranged at a slant so that it assumes a substantially tangential direction. This not only causes the gas to flow through the liquid over a relatively long path, but also keeps the liquid in motion and prevents dirt from settling in the bottom of the drum. In fact a gas velocity may readily and economically be employed, which sufficiently agitates the liquid to cause the same to bubble violently upward so that it descends in the form of a spray 18 through the gas located in the region above the liquid 14. In this manner intimate contact of the gas and liquid is doubly assured because the gas first is forced through the liquid, and the liquid thereafter flows through the gas. The nozzle 16 is preferably made large in diameter and is widely open at the lowermost end thereof, and this fact, together with the relatively small submergence of the nozzle in the liquid, minimizes the power needed to circulate the gas through the drum. This power is further reduced by employing a bank of nozzles in each drum, as will next be described.

Referring now to Figs. 1, 2 and 3 of the drawings, the drum 12 is supplied with gas through a pipe 20 connected to a header 22 from which a bank of nozzles 16 are branched off. These nozzles are each identical with that previously mentioned in connection with Fig. 3, the various nozzles being downwardly directed and arranged in parallel collateral juxtaposition along the length of the drum.

For reasons subsequently described in connection with the absorption of sulphur trioxide, it is preferred to provide two drums 12 and 112 connected in series, and these in the present case are structurally embodied within a single steel shell 24 of sufficient length to enclose both of the drums. The steel shell 24 is lined with an appropriate acid resistant lining 26, and this lining is partitioned at 28 to subdivide the shell into two drums 12 and 112.

Reverting to Fig. 3, the nozzles 16 pass through flanged openings 26 which are welded to steel shell 24. The nozzles 16 are in this instance, preferably made of cast iron and flanged at 28, which flange is adapted to be clamped between the flange 26 and the flange 30 cast integrally with header 22.

The gas forced through drum 12 is largely absorbed, but any residual gas is discharged through an outlet 32 located in the upper portion of drum 12. Drum 112 is provided with a series of nozzles 116 interconnected by a header 122 similar to those described in connection with drum 12. The gas outlet 32 from drum 12 is preferably so located as to be conveniently and directly connected to the header 122. This direct connection is facilitated by locating the bank of nozzles 16 along one side of shell 24 and locating the bank of nozzles 116 along the opposite side of the shell 24. The banks of nozzles, however, are in similar relation to their respective drums, as is clearly evident from an inspection of Fig. 3. The gas outlet 34 from drum 112 may be located, as shown, directly on top of the drum.

Liquid is admitted to drum 12 through an inlet 36, and is discharged from the drum through an outlet 38. The outlet is preferably provided with an adjustable overflow mechanism generally designated 40, which determines the liquid level within the drum and permits the same to be manually adjusted in order to control the submergence of the nozzles, and, if desired, the relative level of the bodies of liquid in drums 12 and 112. Adjustable overflow means 40 may be of conventional type, comprising a control wheel 42 rotation of which raises or lowers a sleeve 44 reciprocable on discharge pipe 46. The liquid passing through outlet 38 must flow over the top of sleeve 44 before running down pipe 46, and the height of the top of sleeve 44 therefore determines the level of the liquid within the drum.

It is important to notice that the difference in head between the liquid inlet 36 and the liquid outlet at the top of sleeve 44, is practically negligible, and that therefore only slight power is needed to pump or circulate the liquid through the drum. Drum 112 is similarly provided with an inlet 136 and an outlet 138 for the liquid, and the latter is preferably provided with an adjustable overflow means 140 corresponding to that used in connection with drum 12. Adjustment of overflow means 140 determines the liquid level in drum 112, and this may, if desired, be set at a level slightly higher than that in drum 12. The outlet 138 is connected to the inlet 36 (see Fig. 1), this providing for liquid flow through drum 112 and then drum 12 in series, in counterflow relation to the gas flow through drum 12 and then drum 112 in series.

The shell 24 may be supported on steel saddles 50 in turn mounted on concrete piers 52. The shell 24 is further provided with manholes 54 and 154 giving access respectively to the interior of drums 12 and 112. Drum 12 is provided with a drain 56, while drum 112 is provided with a corresponding drain 156. These are made of ample dimension so that the drums may be quickly drained and thoroughly flushed out in the event of dirt and sediment collecting in the drums. Such cleaning is not only readily and rapidly accomplished, but is necessary only at extremely long intervals due to the fact that the nozzle system here employed in particularly designed with a view to keeping the dirt in motion with the liquid so that it will flow out of the outlets 38 and 138 instead of settling out.

Referring now to Fig. 4 of the drawings, a flow sheet is presented, showing the application of the present invention to the contact process for manufacturing sulphuric acid. Sulphur trioxide from sulphur oxidizing apparatus of conventional type is supplied to nozzles 16 from which it is discharged through 98% sulphuric acid contained within the shell or tank 24. The absorption liquid or acid is circulated by means of a pump 60 from outlet 38 through cooling coils 62 and back to the liquid inlet 136. The finished sulphuric acid is drawn off through a pipe 64 and led to storage. This discharge is controlled by a valve 66 which may be set either for a continuous trickle, or manually opened at intervals to remove a batch of acid from the system. Water or dilute make-up acid is supplied through a pipe 68, this supply being controlled by a valve 70 which is adjusted for a continuous slow trickle, or which is manually operated to admit the make-up liquid in batches. The discharge of acid through pipe 64 is determined by the strength of the acid in the system, which must be kept between 97.5 and 99% strength in order to obtain the most efficient absorption of the sulphur trioxide fed through nozzle 16. The rate of supply of make-up acid through pipe 68 is, of course, determined by the rate of withdrawal of finished acid through pipe 64.

It will be understood that the single absorber 24 illustrated in this flow sheet is preferably of the type described in connection with Figs. 1 through 3, comprising two drums connected in series. The outlet 34 is open to the atmosphere, and in normal operation the discharge therethrough is entirely free of sulphur trioxide. This desirable result is obtained without difficulty, because the absorption of sulphur trioxide in sulphuric acid when the latter is of 98% strength is practically instantaneous and complete. The provision of a second absorption drum in series with the first absorption drum is not essential, due to the rapid and complete absorption in the first drum, but is preferred in order to insure that the gases discharged into the atmosphere from outlet 34 will be "clean", that is, absolutely free from the acid anhydride.

If the acid anhydride is obtained as a result of the burning of sulphur, it is exceedingly desirable that the air supplied to the sulphur furnace be free from moisture. I have found that the present apparatus is also efficient and valuable when used as an air dryer. For this purpose a tank 224 may be used, which is exactly similar to the tank 24 previously described. The air to be dried is passed through a nozzle system 216 and is thereby forced through a body of liquid in the tank, which is preferably 93% sulphuric acid. The acid absorbs moisture from the air, and the dried air flows through gas outlet 234 and may then be driven by means of a blower 72 to the sulphur furnace. The drying vehicle is preferably circulated, as by means of a pump 260, from liquid outlet 238 through cooling coils 262 and back to the liquid inlet 236. As the circulating acid is diluted by the moisture absorbed from the air, it may be strengthened by the addition of 98% acid through a make-up pipe 74. This is preferably connected to the absorption system previously described, and the bleeding of 98% acid from the absorption system to the drying system may be controlled by a valve 76. The diluted absorption medium may be drawn off through a pipe 78 under the control of a valve 80, and is preferably fed into the absorption system through a pipe 82 where it is again strengthened by the absorption of the acid anhydride.

If it is desired to manufacture fuming sulphuric acid (104% strength), another tank or drum absorption system similar to that described in connection with Figs. 1 through 3 may be provided in the absorption system, ahead of the 98% absorber already described. The absorption medium in this case will be maintained at a strength of from 103 to 105%, and will be circulated through an acid cooler exactly as has already been described. The sulphur trioxide will be led directly from the sulphur oxidizing apparatus into the 104% absorption system, and the gas discharged from this absorption system will in turn be led to the 98% absorption system. The finished acid may be bled, as previously described, and supplied to storage tanks for utilization. The 98% acid from the 98% absorption system is led into the 104% absorption system as make-up for the withdrawn fuming acid.

The drum absorber previously described is also valuable for the absorption of sulphur dioxide to form sulphurous acid, in which case a brick lined steel drum may again be employed. For the absorption of hydrogen chloride to form hydrochloric acid, the lining should be stoneware or rubber or glass or silica, or any material resistant to hydrogen chloride vapor. For the absorption of the oxides of nitrogen the drums may be made of chrome iron, and for this purpose a relatively long series of drums is necessary in order to obtain complete absorption. Nozzles should also be appropriately changed.

In every case, if absorption is aided by cooling, the desired cooling may be provided by the use of cooling coils such as have previously been described. When dealing with any material not necessitating a lining within the drum, as in the case of nitric acid, the cooling may be obtained simply by spraying the outside of the drum with water.

If a gas is to be washed for the removal of dust rather than for the removal of moisture, any suitable liquid vehicle may be employed, and in such case the present apparatus is of particular advantage not only because of the intimate mixture of gas and liquid which is obtained, but also because the dust removed from the gas is not permitted to settle out in the drum, but rather is carried out of the system through the liquid overflow outlet.

It is thought that the mode of constructing and using my improved apparatus for the absorption or washing of a gas by means of a liquid, and the many advantages thereof, will, for the most part, be apparent from the foregoing detailed description thereof. The cost of operation is greatly reduced because the power needed for pumping the liquid is only that needed to overcome pipe friction. The power needed to circulate the gas is a minimum because of the large size of the nozzles, the unobstructed discharge ends thereof, and the relatively small submergence thereof. The apparatus works successfully with dirty liquids such as sludge acid, because the dirt is kept in circulation and is not permitted to settle out and clog up the apparatus. Efficient and complete absorption or washing is obtained because the gas is passed through the liquid by a relatively long path, and thereafter a liquid spray is passed through the gas.

The illustrative applications of the apparatus outlined in the specification are intended merely to show its wide range of usefulness. No claim is herein laid to any of the processes and specific applications aforesaid, such claims being reserved for the filing of additional patent applications.

A plurality of drums may be arranged in parallel or in series or in series and parallel combinations according as the requirements of any particular case may dictate.

It will therefore be apparent that while I have shown and described my invention in the preferred form, many changes and modifications may be made in the structure disclosed, without departing from the spirit of the invention, defined in the following claims.

I claim:

1. Apparatus for bringing a gas and a liquid into intimate contact, comprising a vessel partially filled with the liquid and having an arcuate bottom, a gas inlet including a downwardly directed nozzle the lower end of which is fully open and submerged in the liquid very close to one side of the vessel, and a gas outlet above the liquid, whereby the gas and with it the liquid are circulated downwardly and then upwardly around the aforesaid arcuate bottom.

2. Apparatus for bringing a gas and a liquid into intimate contact, comprising a drum-shaped vessel arranged with its axis horizontal, an inlet for the liquid, an outlet for the liquid arranged to retain a body of the liquid in the drum, a liquid cooler, pump mechanism for circulating the liquid from the outlet through the cooler and back to the inlet, a gas inlet including a downwardly directed nozzle the lower end of which is submerged in the liquid at one side of the drum so that the admitted gas is directed peripherally around the interior of the drum, and a gas outlet located in the upper portion of the drum.

3. Apparatus for the absorption or washing of a gas by means of a liquid, comprising a drum-shaped vessel which is long relative to its diameter and which is positioned with its longitudinal axis horizontal, an inlet for the liquid, an outlet for the liquid, arranged to maintain a liquid level approximately half filling the drum, a liquid cooler, pump mechanism for circulating the liquid from the outlet through the cooler and back to the inlet, a gas inlet comprising a bank of downwardly directed nozzles arranged in parallel collateral juxtaposition along the length of the drum, the lower ends of said nozzles being submerged in the liquid, said nozzles being positioned along one side of the drum so that the admitted gas is directed peripherally around the interior of the drum, a gas supply header extending along and connected with the upper ends of the nozzles, and a gas outlet located in the upper portion of the drum.

4. Apparatus for bringing a gas and a liquid into intimate contact, comprising a drum-shaped vessel which is long relative to its diameter and which is positioned with its longitudinal axis horizontal, an inlet for the liquid, an outlet for the liquid, adjustable overflow means in said outlet to establish a liquid level approximately half filling the drum, a liquid cooler, pump mechanism for circulating the liquid from the outlet through the cooler and back to the inlet, a gas inlet comprising a bank of downwardly directed nozzles arranged in parallel collaterial juxtaposition along the length of the drum, the lower ends of said nozzles being fully open and submerged in the liquid an amount dependent upon the adjustment of the liquid overflow, said nozzles being arranged at a slant along one side of the drum so that the admitted gas is directed in a peripheral or tangential direction around the interior of the drum, a gas supply header extending along and connected with the upper ends of the nozzles, and a gas outlet located in the upper portion of the drum.

5. Apparatus for the absorption or washing of a gas by means of an acid, comprising a drum-shaped steel shell which is long relative to its diameter and which is positioned with its longitudinal axis horizontal, an acid resistant lining arranged within said shell and including a partition subdividing the shell into two drums arranged end to end, an inlet in each of said drums for the liquid, an outlet in each drum for the liquid, adjustable overflow means in said outlets to retain a body of liquid in each of said drums, means connecting the outlet of the first drum to the inlet of the second drum, a liquid cooler, pump mechanism for circulating the liquid from the outlet of the second drum through the cooler and back to the inlet of the first drum, gas inlets for said drums each comprising a bank of downwardly directed nozzles arranged in parallel collateral juxtaposition along the length of the drum, the lower ends of said nozzles being fully open and submerged in the liquid an amount dependent upon the adjustment of the liquid overflow means, said banks of nozzles being arranged along opposite sides of the shell at a slant such that the admitted gas is directed in a peripheral or tangential direction around the interior of the drums, a gas supply header extending along and connected with the outer ends of each of the banks of nozzles, a gas outlet located in the upper portion of the second drum and connected to the inlet header of the first drum, and a gas outlet located in the upper portion of the first drum.

6. A method of washing gases by means of a liquid which comprises providing a body of liquid, the lower surface of which is arcuate, injecting gases downwardly and tangentially into said liquid at a point in proximity to said lower surface, the force of said injection being sufficient to produce a spray above said body, and causing said spray to fall back into said body.

INGENUIN HECHENBLEIKNER.